Patented Mar. 14, 1950

2,500,570

UNITED STATES PATENT OFFICE 2,500,570

PRODUCTION OF TETRAMETHYLOL-CYCLOPENTANONE

Gardner C. Ray, Bartlesville, Okla., assignor to Phillips Petroleum Company, a corporation of Delaware No Drawing. Application October 26, 1945, Serial No. 624,949

6 Claims. (Cl. 260—586)

The present invention relates to a process for the production of an organic compound by a condensation reaction. In one of its more specific aspects it relates to an improved process for the condensation of cyclopentanone and formaldehyde to produce tetramethylolcyclopentanone.

Tetramethylolcyclopentanone is a valuable compound for use in the manufacture of explosives and as an intermediate in organic syntheses. Tetramethylolcyclopentanone may be produced by the reaction of one mole of cyclopentanone with four mols of formaldehyde under certain reaction conditions (Mannich and Brose, Ber. 56, 833 (1923)). This reaction liberates a very large quantity of heat and must be carefully controlled to give satisfactory yields of the desired product. Excessive reaction temperature or a very slow rate of condensation results in undesirable side reactions which lower the yield and quality of the tetramethylolcyclopentanone product produced. It is desirable to carry out the reaction of cyclopentanone and formaldehyde at a temperature such that the rate of reaction is very rapid and at the same time to remove the heat of reaction from the reaction locus as rapidly as it is liberated to prevent a rise in temperature and consequent undesirable by-products formation. Because of the rapid rate of reaction and the large quantities of heat liberated thereby, ordinary methods of carrying out condensation reactions are not suited to this particular reaction.

On a commercial scale, condensation reactions are conventionally carried out in apparatus provided with means for removing the heat of reaction by the circulation of a suitable cooling medium through or around the apparatus. Apparatus provided with the large cooling capacity required for the removal of the quantity of heat liberated by the reaction of cyclopentanone with formaldehyde is expensive and is not entirely satisfactory for this reaction. In certain cases only slow heat transfer between the reactants and the cooling medium can be obtained. In addition, control equipment must be provided for circulation of the coolant liquid, etc. I have found that certain types of portionwise addition of the cyclopentanone and the formaldehyde, which increase the time required for the reaction to take place, with the consequent gradual liberation of the heat of reaction, fail to act as a satisfactory heat control method for this condensation. In such cases undesirable side reactions occur during the prolonged reaction time and there results a product of inferior quality in low yield. I have also found that it is not feasible to add ice or cooling water directly to the reaction mixture to control the evolution of heat of this condensation reaction. The large quantity of coolant required for this particular reaction dilutes the reaction mixture excessively, lowers the reaction rate and prolongs the reaction time. This method also increases the load on any type evaporation equipment used for recovery of the tetramethylolcyclopentanone from the resulting mixture.

An object of this invention is to provide an improved process for the production of an organic compound by a condensation reaction. Another object of this invention is to provide an improved process for the condensation of cyclopentanone and formaldehyde to produce tetramethylolcyclopentanone. Still another object of this invention is to provide such a process with an improved method for removing the heat of reaction. Other objects and advantages will be apparent to those skilled in the art from the following detailed description of my invention.

In accordance with the present invention, the condensation reaction of cyclopentanone and formaldehyde is carried out in an aqueous solution of the reactants in the presence of a liquid coolant inert to the reaction and having a boiling point approximately equal to the desired reaction temperature at the reaction pressure. The pH of the solution is preferably maintained between 9 and 10. Calcium oxide and calcium hydroxide are preferred as the agents to be added for control of the pH or hydrogen ion concentration during the reaction. Heat is efficiently removed from the reaction zone at the reaction locus by vaporization of the inert liquid coolant. The vapors of the inert liquid are removed from the reaction zone and may be condensed for reuse if so desired. This means of heat removal provides an effective method for holding the reaction temperature at a constant and desired level. Rapid reaction is thus effected at the optimum temperature level, producing a product of high quality in excellent yield.

The cyclopentanone-formaldehyde condensation reaction is conducted by mixing with an aqueous solution of the reactants a material, preferably a hydrocarbon, that boils at approximately the desired reaction temperature, i. e. 120° F., that is substantially immiscible with the aqueous solution, and that is chemically inert with respect to the reactants. Suitable materials are cyclopentane and neohexane when the condensation is conducted at atmospheric pressure, and normal pentane when the condensation is conducted at pressures in the range of 20 to 25 pounds per square inch. Heat of reaction is thus consumed for the most part by vaporization of the added material. The quantity of material added must be sufficient to maintain a separate liquid phase during the condensation reaction i. e. an amount in excess of the amount soluble in the reaction mixture must be used. When the condensation reaction is conducted in a batchwise manner, the temperature of the reaction zone remains approximately that of the boiling point of the chosen hydrocarbon coolant during the major part of the condensation, provided enough hydrocarbon is used to maintain a separate liquid phase in the reactor. Since 115–125° F. is the desired temperature range for conducting the reaction, cyclopentane (B. P. 121° F.), for example, will hold the temperature of the reactants in the proper region at substantially atmospheric pressure. Because the reaction temperature is essentially set by the boiling point of the chosen coolant at the reaction pressure, no elaborate temperature control equipment, feed control devices, or other means of controlling the temperature of the reaction zone is required. The distribution ratio for tetramethylolcyclopentanone between the two liquid phases in the reactor is such that this product is essentially all present in the aqueous phase. Hence the cyclopentane may be reused without further treatment at no appreciable expense of lost product.

The following examples illustrate specific aspects of the process of the present invention and are to be interpreted as illustrative only.

Example I

To a three-neck flask fitted with a thermometer, a reflux condenser, and a mechanical stirrer was added 175 cc. of cyclopentane. The following mixture was prepared and poured into the flask over a period of less than one minute.

| | |
|---|---|
| Cyclopentanone _____ gm__ | 19.0 |
| Aqueous formaldehyde (37.7 weight per cent) _____ gm__ | 77.0 |
| Standard phenolphthalein _____ cc__ | 1.0 |
| Calcium oxide _____ gm__ | 0.4 |
| Water _____ gm__ | 50 |

The reaction began instantly, and rapid heat evolution took place. When the temperature of the reaction zone reached the boiling point of the upper phase of cyclopentane (121° F.), the hydrocarbon boiled vigorously, absorbing about 107 calories per gram of cyclopentane vaporized at this temperature. A water-cooled condenser, open to the atmosphere, prevented appreciable loss of the cyclopentane.

The major part of the heat evolution took place within the first 15 minutes of reaction. However, the mixture was stirred 1.5 hours longer to insure completion of the reaction. The temperature of the reaction zone dropped gradually to 80° F. during this period. The aqueous phase was then separated and the catalyst neutralized with HCl. The water and the excess formaldehyde were removed under reduced pressure. The resulting solid product (43.6 gm.) was dried in an oven at 158° F. for several hours. Its melting point of 262–275° F. showed it to be essentially pure tetramethylolcyclopentanone. The yield of this product was 94% of theory. Pure tetramethylolcyclopentanone (M. P. 289° F.) was obtained by recrystallizing a portion of the product from anhydrous methanol.

Example II

The following mixture was prepared as described in Example I:

| | |
|---|---|
| Cyclopentanone _____ gm__ | 19.0 |
| Aqueous formaldehyde (37.7 weight per cent) _____ gm__ | 77.0 |
| Calcium oxide _____ gm__ | 0.3 |
| Standard phenolphthalein _____ gm__ | 1.0 |
| Cyclopentane _____ cc__ | 100 |

The condensation reaction was conducted and the resulting product recovered as described in Example I. Results from this experiment were as follows:

| | |
|---|---|
| Grams of tetramethylolcyclopentanone recovered _____ | 43.0 |
| Yield of tetramethylolcyclopentanone (per cent of theory) _____ | 93 |
| Melting point of product (°F.) _____ | 251–278 |

Recrystallization of a sample of this product from anhydrous methanol gave pure tetramethylolcyclopentanone (M. P. 289° F.).

Although the pressure used in Examples I and II was atmospheric and the hydrocarbon coolant employed was cyclopentane, it is to be understood that it is not intended to limit the practice of the invention to these specific conditions. Instead of normally liquid hydrocarbons, normally gaseous hydrocarbons, such as propane or butane, held under sufficient pressures to maintain their boiling points in the region of 120–125° F. will serve the purpose of controlling the heat evolution of the cyclopentanone-formaldehyde condensation reaction in a manner similar to that described under Examples I and II.

From the foregoing, it is believed that the many advantages obtainable by the practice of the present invention will be readily apparent to persons skilled in the art. However, since certain changes may be made in carrying out the above method without departing from the scope of the invention as defined by the appended claims, it is intended that all matter contained herein shall be interpreted as illustrative and explanatory, rather than in a limiting sense.

I claim:

1. A process for the production of tetramethylolcyclopentanone which comprises reacting cyclopentanone with formaldehyde at a temperature within the range of 115 to 125° F. in a reaction zone in an aqueous solution having a pH within the range of 9 to 10 in the presence of a liquid hydrocarbon coolant inert to the reaction and having a boiling point within the range of 115 to 125° F. at the reaction pressure, and removing vapors of said coolant from the reaction zone during the reaction.

2. A process as defined in claim 1 wherein the pH of the aqueous solution is maintained with calcium oxide.

3. A process for the production of tetramethylolcyclopentanone which comprises reacting cyclopentanone with formaldehyde at a temperature within the range of 115 to 125° F. in an aqueous solution having a pH within the range of 9 to 10 and in the presence of a liquid coolant substantially immiscible in said aqueous solution and inert to the reaction and having a boiling point within the range of 115 to 125° F. at the reaction pressure, and removing vapors of said coolant from the reaction zone during the reaction.

4. A process for the production of tetramethylolcyclopentanone which comprises reacting cyclopentanone with formaldehyde at a temperature within the range of 115 to 125° F. in an aqueous solution having a pH within the range of 9 to 10 at substantially atmospheric pressure and in the presence of cyclopentane in an amount in excess of the amount soluble in said solution, and removing vapors of cyclopentane from the reaction zone during the reaction.

5. A process for the production of tetramethylolcyclopentanone which comprises reacting cyclopentanone with formaldehyde at a temperature within the range of 115 to 125° F. in an aqueous solution having a pH within the range of 9 to 10 at substantially atmospheric pressure and in the presence of neohexane in an amount in excess of the amount soluble in said solution, and removing vapors of neohexane from the reaction zone during the reaction.

6. A process for the production of tetramethylolcyclopentanone which comprises reacting cyclopentanone with formaldehyde at a temperature within the range of 115 to 125° F. in an aqueous solution having a pH within the range of 9 to 10 and at a pressure within the range of 20 to 25 pounds per square inch absolute in the presence of normal pentane, and removing vapors of normal pentane from the reaction zone during the reaction.

GARDNER C. RAY.

REFERENCES CITED

The following references are of record in the file of this patent:

UNITED STATES PATENTS

| Number | Name | Date |
|---|---|---|
| 1,564,218 | Dow | Dec. 8, 1925 |
| 2,205,885 | Jackson | June 25, 1940 |

OTHER REFERENCES

Mannich et al., Berichte, 56B, pages 833–44 (1923).